(12) United States Patent
Findeisen et al.

(10) Patent No.: US 7,765,528 B2
(45) Date of Patent: Jul. 27, 2010

(54) IDENTIFYING SOURCES OF MEMORY RETENTION

(75) Inventors: Piotr Findeisen, Plano, TX (US);
Yanhua Li, Sunnyvale, CA (US);
Joseph A. Coha, San Jose, CA (US);
David I. Seidman, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1325 days.

(21) Appl. No.: 11/232,330

(22) Filed: Sep. 21, 2005

(65) Prior Publication Data
US 2007/0067758 A1    Mar. 22, 2007

(51) Int. Cl.
G06F 9/44    (2006.01)
G06F 9/45    (2006.01)
G06F 9/46    (2006.01)
G06F 17/30   (2006.01)

(52) U.S. Cl. .................. 717/131; 717/154; 718/104; 707/206

(58) Field of Classification Search ................ 717/127, 717/154; 707/206; 718/104
See application file for complete search history.

(56) References Cited

U.S. PATENT DOCUMENTS

| | | | |
|---|---|---|---|
| 5,561,786 A | 10/1996 | Morse | |
| 5,590,329 A | 12/1996 | Goodnow, II et al. | |
| 6,526,421 B1 | 2/2003 | Houldsworth | |
| 6,640,290 B1 | 10/2003 | Forin et al. | |
| 6,658,652 B1 * | 12/2003 | Alexander et al. | 717/128 |
| 6,763,440 B1 | 7/2004 | Traversat et al. | |
| 7,234,080 B2 * | 6/2007 | Cirne et al. | 714/38 |
| 2005/0076184 A1 * | 4/2005 | Schumacher | 711/170 |
| 2005/0204342 A1 * | 9/2005 | Broussard | 717/124 |
| 2006/0136530 A1 * | 6/2006 | Rossmann | 707/206 |
| 2006/0206885 A1 * | 9/2006 | Seidman et al. | 717/148 |
| 2006/0253845 A1 * | 11/2006 | Achanta et al. | 717/151 |
| 2006/0259528 A1 * | 11/2006 | Dussud et al. | 707/206 |
| 2008/0178189 A1 * | 7/2008 | Findeisen et al. | 718/104 |

OTHER PUBLICATIONS

David Rubinstein, "Making Applications Behave in Production Environments", SD Times Software Development Magazine, Feb. 15, 2003, Path Communications.

* cited by examiner

*Primary Examiner*—Wei Y Zhen
*Assistant Examiner*—Chih-Ching Chow

(57) ABSTRACT

One embodiment relates to a method for identifying sources of memory retention in an executing application. A size of a set of objects is tracked over multiple periods. A period is determined to be a growth period if the size for the set of objects increases above a previous maximum size, and the number of growth periods is counted. The set of objects is flagged as having potential undesired object retention (a memory leak) if the number of growth periods is greater than a threshold number. Other embodiments are also disclosed.

19 Claims, 4 Drawing Sheets

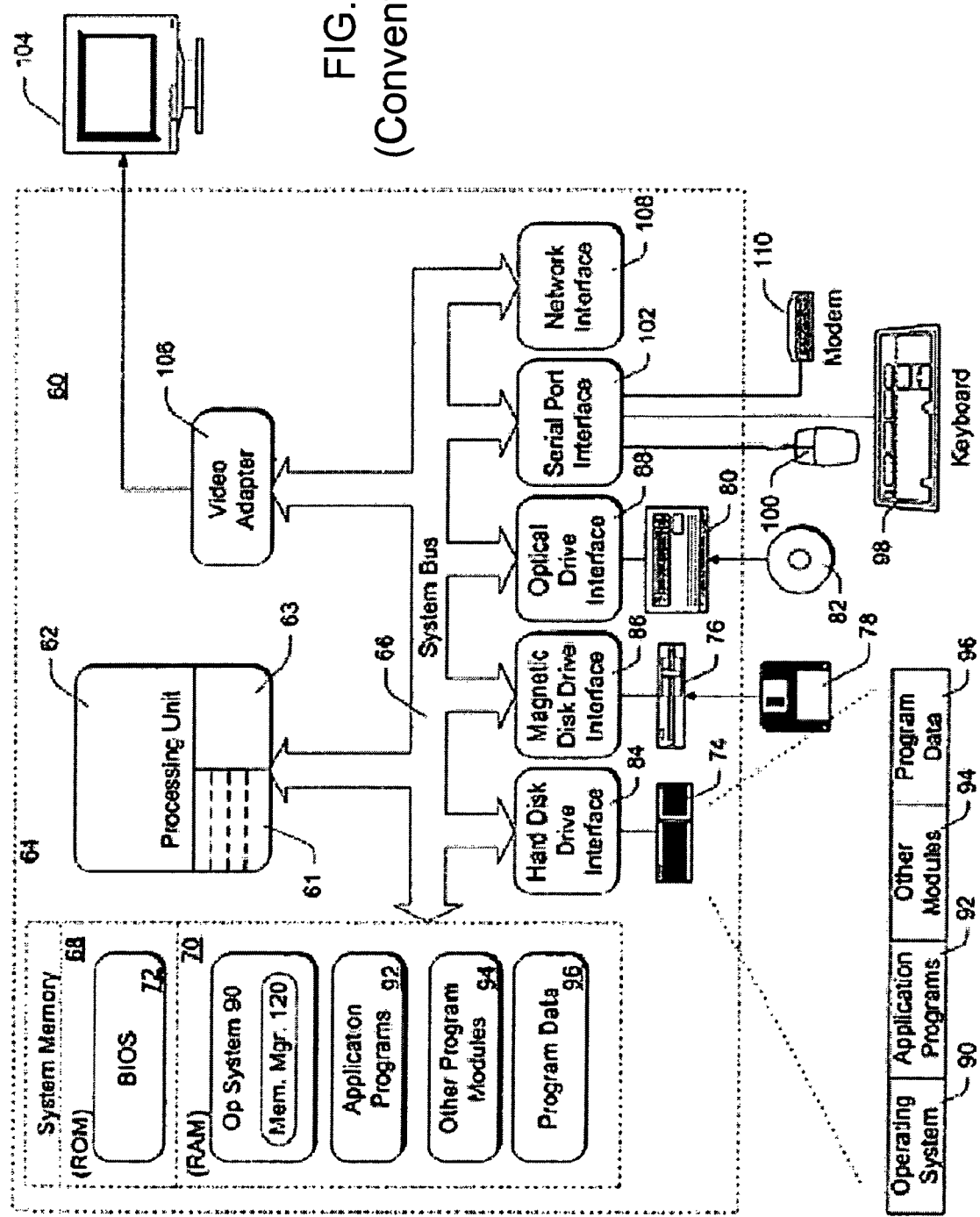
FIG. 1 (Conventional)

IDENTIFYING SOURCES OF MEMORY RETENTION

BACKGROUND OF THE INVENTION

1. Field of the Invention

The present invention relates generally to computer systems.

2. Description of the Background Art

Undesired Retention of Limited Resources

One of the issues involved in information processing on computer systems is the undesired retention of limited resources by computer programs, such as applications or operating systems. Typically, a computer system is comprised of limited resources, regardless of whether the resources are physical, virtual, or abstract. Examples of such resources are CPU cycles, memory, disk space, file descriptors, socket port numbers, database connections or other entities that are manipulated by computer programs.

A computer program may dynamically allocate resources for its exclusive use during its execution. When a resource is no longer needed, it may be released by the program. Releasing the resource can be done by an explicit action performed by the program, or by an automatic resource management system.

Undesired Memory Retention and Memory Leaks

As mentioned above, one example of a managed resource is memory in a computer system that may be allocated to programs at runtime. In other words, this portion of memory is dynamically managed. The entity that dynamically manages memory is usually referred to as a memory manager, and the memory managed by the memory manager is often referred to as a memory "heap." Portions of the memory heap may be allocated temporarily to a specific program and then freed when no longer needed by the program. Freed portions are available for re-allocation.

In some programming languages and their associated runtimes, such as C and C++ and others, the memory manager functionality is typically provided by the application program itself. Any release of memory no longer needed by the program is controlled by the programmer. Failure to explicitly release unneeded memory results in memory being wasted, as it will not be used by this or any other program. Program errors which lead to such wasted memory are often called "memory leaks."

In other programming languages and their runtimes, such as Java, Eiffel, C sharp (C#) and others, automatic memory management is employed, rather than explicit memory release. Automatic memory management, popularly known in the art as "garbage collection," is an active component of the runtime system associated with the implementation of these programming languages and their associated runtimes. Automatic memory management solves the problem of applications that do not explicitly release unneeded memory by automatically returning those unused portions of memory when there are no longer any references from a defined root set of data structures to the data structures allocated by the program in that region of memory.

However, another problem can occur with automatic memory management—the retention of references to the data structures in portions of memory, data structures that will not be used in the future execution of the application. The references to these unused data structures in these areas generally prevent the automatic garbage collector from re-claiming the unused portions of memory. In the common vernacular, undesired memory retention in runtimes that support automatic memory management is also referred to as "memory leaks." For example, in the Java runtime, these are often referred to as "Java memory leaks."

It is highly desirable to discover the presence of undesired memory retention in an application. Moreover, after discovering the presence of undesired memory retention in an application, it is highly desirable to quickly find the root cause of the problem and identify the root cause's surrounding context. One can then use this information to fix the problem.

Despite the use of garbage collection, object retention problems, often called "memory leaks," frequently occur in Java applications. This undesired object retention may eventually cause a Java application to crash when all memory resources are consumed. In the short term, the runtime's management of large numbers of unused objects causes application slow-down and higher costs for the application in production deployment. Similarly, applications based on other programming languages and runtimes also have similar resource consumption problems.

It has been determined that undesired object retention (a memory leak) occurs when there are references to an object that make that object reachable from a set of root objects in the application, but the object will never be used again by the application. In that case, the application could use the object if needed, but the application does not use the object, so keeping the object in memory is a waste of memory.

The object that is able to be referenced from the root set of objects in the application through either direct or indirect references is frequently referred to as a "live" object. Other means or techniques of determining liveness also exist, including reference counting, and these alternate techniques may also be used.

For example, a Java application may create objects during a Java Enterprise Edition, also referred to as J2EE (Java 2 Platform Enterprise Edition), transaction and inadvertently cache references to these created objects. If these objects are no longer used by the application after the completion of the transaction, the references to the objects remain in the cache, and the cache itself remains reachable from the root set of objects, then these transaction-related objects continue to occupy memory—undesired object retention. In this case, a little more free (or unused) memory is lost (leaked) each time the application performs such a J2EE transaction.

Moreover, such memory leaks frequently occur in deployed web and mission-critical applications that are actively serving customers. The resultant crashes that occur when no additional memory is available for the application directly impact customer service and sales.

Existing solutions to the above discussed problem are typically too intrusive to the application and/or do not give an operator enough information about the root cause and context of the undesired object retention (memory leak). Most of the existing solutions for locating retained objects are applicable only in development environments because i) their high overhead would be too intrusive to use with a deployed application in production, ii) their need for user interaction to help in determining the undesired object retention's root cause and context, and/or iii) their lack of scalability.

Memory leak analysis of a running application should preferably be performed with very low performance degradation, typically no more than about 5 percent usage of the critical program resources when the production system is highly utilized. In addition, the application should not be made to pause for several seconds, and the analysis should not require large amounts of memory.

In addition, operators of data centers, where web or other mission-critical applications are frequently hosted, are under pressure to diagnose problems quickly but the users themselves may not have sophisticated debugging knowledge. As such, it is desirable to be able to indicate to a data center operator exactly where memory leaks may be occurring, and to give such indication as early as possible. Root cause analysis and identification of the context of the problem in the production environment helps to reduce the overall cost of fixing the problem by enabling quick re-configuration or defect-repair of the application. Such detailed diagnosis avoids the requirement for costly, and often unsuccessful, attempts to recreate the problem in the development environment.

SUMMARY

One embodiment of the invention relates to a method for identifying sources of undesired memory retention with low overhead in an executing application. A size for a set of objects is tracked over multiple periods. A period is determined to be a growth period if the size for the set of objects increases above a previous maximum size. The number of growth periods is counted. The set of objects is flagged as having a potential memory leak if the number of growth periods is greater than a first threshold number.

Other embodiments are also disclosed.

BRIEF DESCRIPTION OF THE DRAWINGS

FIG. 1 is a schematic diagram of an exemplary computer system in the context of which an embodiment of the invention may be implemented.

DETAILED DESCRIPTION

Figure 2A:
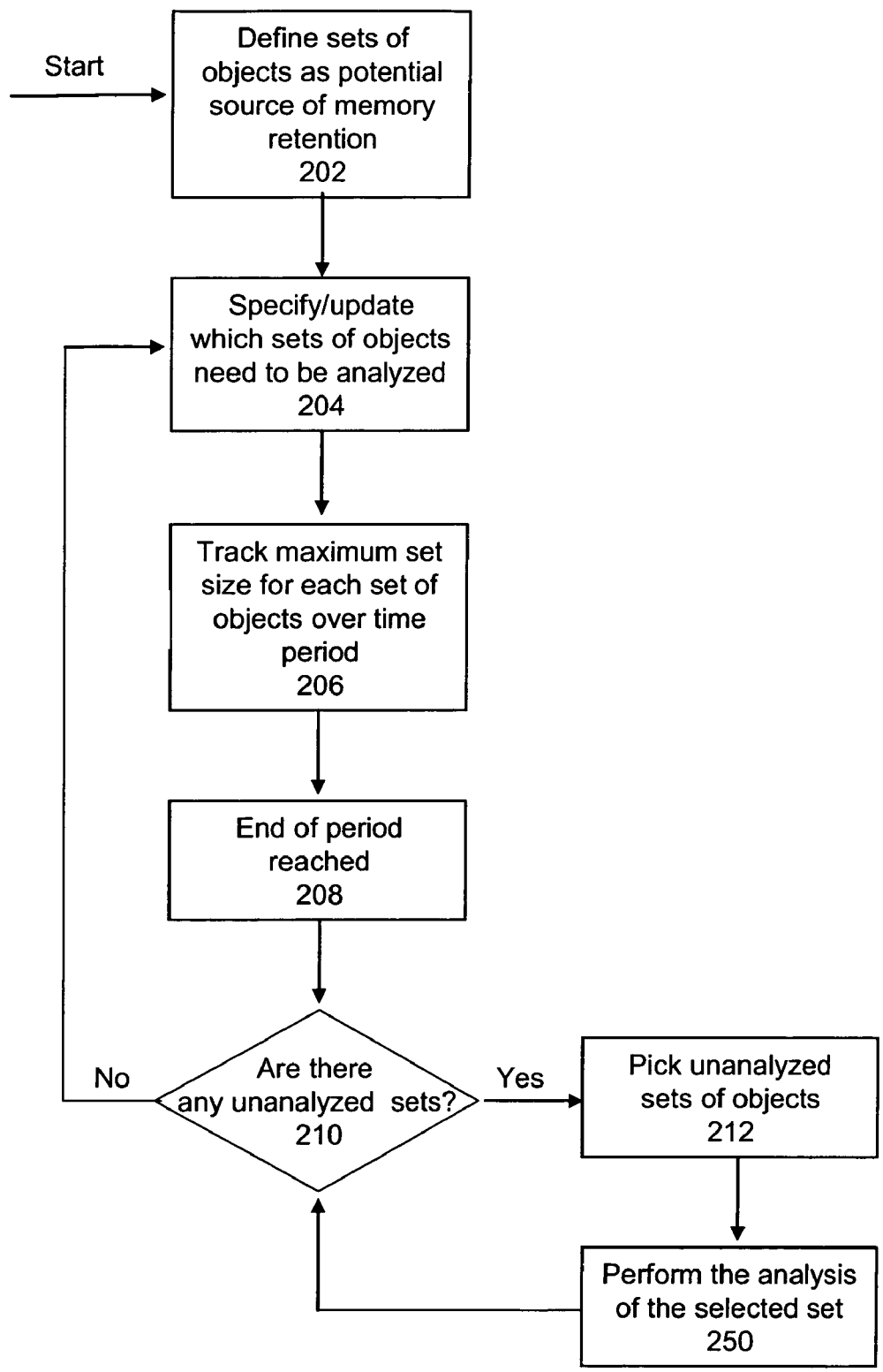
FIG. 2A is a flow chart depicting an exemplary method for determining sets of objects that may be contributing to undesired object retention in an application in accordance with an embodiment of the invention.

The present disclosure provides an advantageous solution to the above-discussed problems. In particular, methods and apparatus for identifying undesirable memory retention and finding the root cause and context are disclosed. In accordance with an embodiment of the invention, typical patterns known to appear with memory retaining (leaking) applications are detected, and sampling is used to minimize the overhead required for the retention (leakage) detection. Advantageously, memory leak locations, root causes and contexts may be detected with pinpoint specificity and with low overhead in accordance with an embodiment of the invention.

Example Computer System

An embodiment of the invention may be implemented in the context of a computer system, such as, for example, the computer system 60 depicted in FIG. 1. Other embodiments of the invention may be implemented in the context of different types of computer systems or other systems.

The computer system 60 may be configured with a processing unit 62, a system memory 64, and a system bus 66 that couples various system components together, including the system memory 64 to the processing unit 62. The system bus 66 may be any of several types of bus structures including a memory bus or memory controller, a peripheral bus, and a local bus using any of a variety of bus architectures.

Processor 62 typically includes cache circuitry 61, which includes cache memories having cache lines, and pre-fetch circuitry 63. The processor 62, the cache circuitry 61 and the pre-fetch circuitry 63 operate with each other as known in the art. The system memory 64 includes read only memory (ROM) 68 and random access memory (RAM) 70. A basic input/output system 72 (BIOS) is stored in ROM 68.

The computer system 60 may also be configured with one or more of the following drives: a hard disk drive 74 for reading from and writing to a hard disk, a magnetic disk drive 76 for reading from or writing to a removable magnetic disk 78, and an optical disk drive 80 for reading from or writing to a removable optical disk 82 such as a CD ROM or other optical media. The hard disk drive 74, magnetic disk drive 76, and optical disk drive 80 may be connected to the system bus 66 by a hard disk drive interface 84, a magnetic disk drive interface 86, and an optical drive interface 88, respectively. The drives and their associated computer-readable media provide nonvolatile storage of computer readable instructions, data structures, program modules and other data for the computer system 60. Other forms of data storage may also be used.

A number of program modules may be stored on the hard disk, magnetic disk 78, optical disk 82, ROM 68, and/or RAM 70. These programs include an operating system 90, one or more application programs 92, other program modules 94, and program data 96. A user may enter commands and information into the computer system 60 through input devices such as a keyboard 98 and a mouse 100 or other input devices. These and other input devices are often connected to the processing unit 62 through a serial port interface 102 that is coupled to the system bus 66, but may be connected by other interfaces, such as a parallel port, game port, or a universal serial bus (USB). A monitor 104 or other type of display device may also be connected to the system bus 66 via an interface, such as a video adapter 106. In addition to the monitor, personal computers typically include other peripheral output devices (not shown) such as speakers and printers. The computer system 60 may also have a network interface or adapter 108, a modem 110, or other means for establishing communications over a network (e.g., LAN, Internet, etc.).

The operating system 90 may be configured with a memory manager 120. The memory manager 120 may be configured to handle allocations, reallocations, and deallocations of RAM 70 for one or more application programs 92, other program modules 94, or internal kernel operations. The memory manager may be tasked with dividing memory resources among these executables.

Exemplary Method of Identifying and Locating Suspected Memory Leaks

FIG. 2A is a flow chart depicting an exemplary method 200 of identifying sources of undesired memory retention in accordance with an embodiment of the invention. The method 200 is used to analyze sets of objects in order to identify whether each set is a potential "memory leak" (e.g., a source of undesired object retention). The determination of whether a set of objects is a potential memory leak is based on how the set of objects changes over time. More particularly, in accordance with an embodiment of the invention, such determination may be based on the pattern of growth and non-growth periods for the set of objects.

First, sets of objects may be defined (202) for the purpose of this method 200. There are various ways to define such sets. In an embodiment, a set of objects may be defined as objects aggregated into a collection class, such as a Java collection class. In another embodiment, a set of objects may be defined as all objects of a particular type. In another embodiment, a set of objects may be defined to be all objects reachable from a given object in the application. The preceding definitions are not intended to be exhaustive. Other ways of defining sets of objects in accordance with embodiments of the invention are also possible. Regardless of the definitions of the sets of objects, which sets are to be tracked and analyzed may be specified (204) automatically or by a user in accordance with an embodiment of the invention.

The maximum set size over the time period is tracked (206) for each set of objects specified. For example, the size of a set of objects may be obtained by interfacing with the memory management system. The tracking may be performed, for example, by sampling the size of the set of objects periodically over time. The frequency of the sampling may be configurable. Depending on situations, the sampling frequency may be set relatively low so as to minimize the overhead imposed by the method 200 (for example, to 5% overhead or less) while being sufficiently high to provide a reasonably accurate tracking of the size of the set of objects.

Another way to track the size of a set of objects is to get the size of the set when the set of objects is modified. To reduce the overhead imposed by the method 200 of FIG. 2A, not every modification of the set needs to result in obtaining the set size. For example, a counter may be used to count the times a new object was added to the set of objects. A size check may be performed when the counter modulo CONSTANT1==0, where CONSTANT1 is a constant number defining the frequency of size checks in terms of new objects added. A lower value for CONSTANT1 results in more frequent checking but higher overhead, while a higher value for CONSTANT1 results in less frequent checking and lower overhead.

The elapsed time may be recognized as a sequence of elapsed periods. In accordance with an embodiment, the length of each period may be a fixed length of time. In accordance with another embodiment, the length of each period may be a variable length of time. The variable length of time may depend on a configurable parameter. For example, the variable length of time may depend on an application load. The application load may correspond to a level of activity or use of the application. In accordance with another embodiment, the "elapsed time" may be tracked in terms of events (rather than in terms of actual time elapsed). The events may comprise running the automatic management software ("garbage collection") or may comprise other types of events.

When an end of the period is reached (208), all specified sets of objects in block 204 are analyzed as to whether they represent potential sources of undesired memory (object) retention. For this purpose, while there are any unprocessed (not yet analyzed) sets of objects 210, the algorithm picks or selects (212) one of such sets and performs (250) the analysis of the selected set. After the analysis, the method goes back to block 210 to test for any unprocessed sets. After all sets of objects are processed, the method updates 204 the sets of objects to be analyzed. This step is done to ensure that any newly created sets of objects that satisfy the defined criteria in block 202 are incorporated in the future analysis.

Figure 2B:
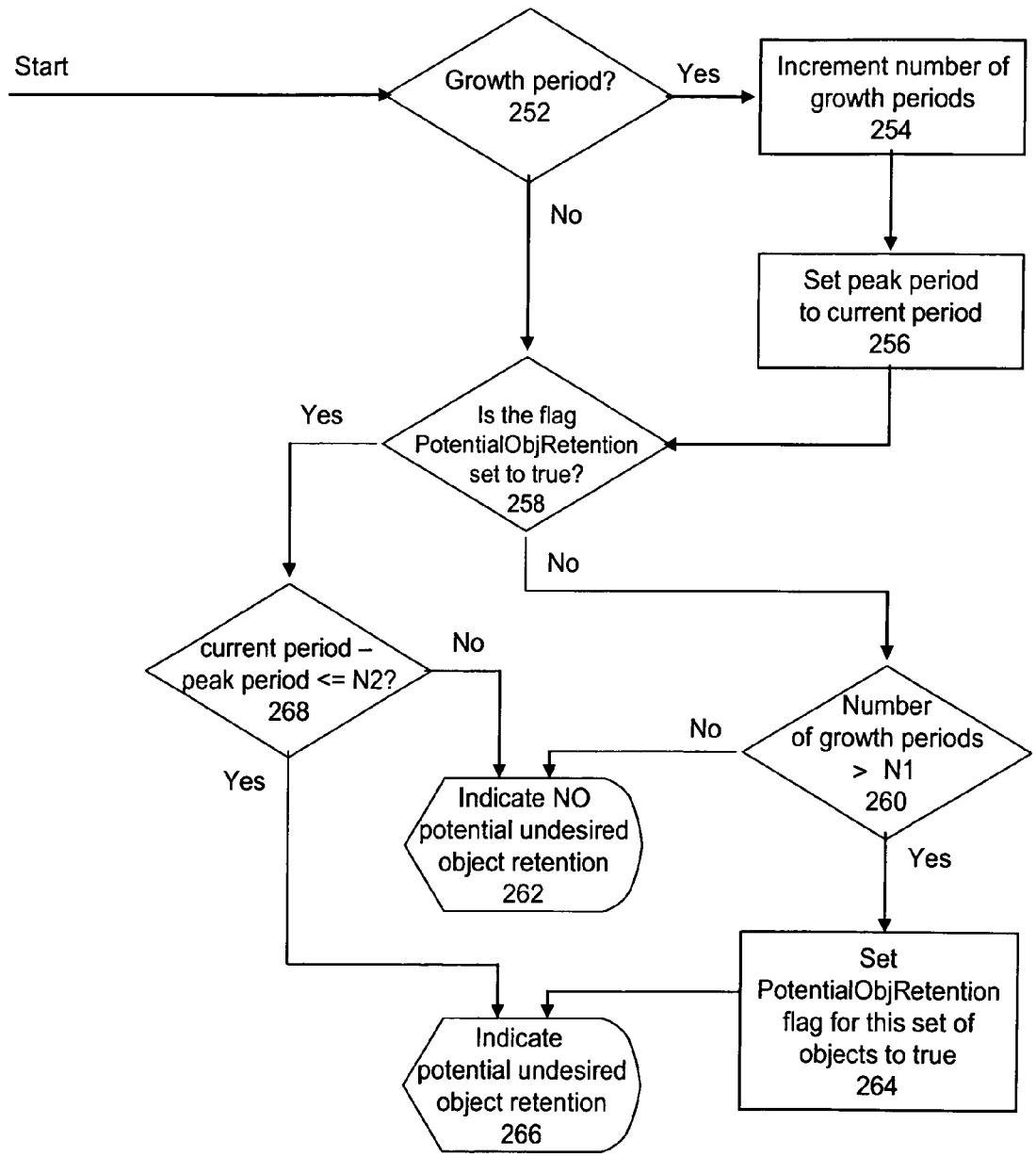
FIG. 2B is a flow chart depicting an exemplary method of locating sources of undesired memory retention in accordance with an embodiment of the invention.

Regarding the analysis of a set of objects in block 250, a flow chart depicting such an analysis is given in FIG. 2B in accordance with an embodiment of the invention. A determination (252) is made as to whether the period just completed (the "current" period) is considered to be a "growth period" for this set of objects. In accordance with an embodiment of the invention, a given period is considered to be a growth period if it is observed during this time period that the maximum size for the set of objects increased to a size above a previously observed maximum size. If a period is not designated as a growth period, then it is designated as a "non-growth period." An example showing periods designated as growth and non-growth periods is discussed below in relation to FIG. 3.

If the current period is determined to be a growth period, then a counter tracking the number of elapsed growth periods is incremented 254. In addition, a peak period for this set of objects is set (256) to be the current time period. The peak period is the time period with the highest observed size for this set of objects. If the observed size corresponding to a growth period exceeds a previously observed maximum, then the new peak period corresponds to the most recently observed growth period.

When the time period is not a growth period, and also after adjusting the peak period in block 256 a check (258) is performed as to whether this set of objects has been previously flagged (264). In the case the set has not been flagged, a determination (260) is then made as to whether the number of elapsed growth periods is greater than a first threshold number N1. The threshold number N1 may be a configurable parameter. In an embodiment, N1 may be different depending upon the set of objects being tracked. In another embodiment, N1 may be the same for each set of objects being tracked.

Lowering N1 for a set of objects makes the method 250 more sensitive to a possible growth trend in that set of objects, so that a potential memory leak in that set of objects would be flagged earlier. Raising N1 for a set of objects makes the method 250 less sensitive to a possible growth trend in that set of objects, so that false positive indications of potential memory leaks in that set of objects become less likely. The value of constant N1 may also be dynamically calculated by the system over time as the application runs or be reset by a mechanism that allows adjustment of the value from outside of the process, for any of a set of objects or for all objects.

If the number of elapsed growth periods is still less than or equal to N1, then no memory leak is indicated (262) at this time in this set of objects. This is because the number of growth periods observed is so far insufficient to warrant concern of a memory leak therein.

On the other hand, if the number of elapsed growth periods is determined (260) to be greater than N1, then the set of objects is flagged (264), and indicated (266) as a potential memory leak. The flag indicates that a sufficient number of growth periods have been observed to warrant concern of a memory leak in this set of objects. The memory leak indication (266) may be sent to a system operator or other user. The memory leak indication (266) may also be used by the running system to reconfigure or correct the problem.

To further specify the source of undesired memory retention to the user, a more specific analysis may be performed. In particular, context information related to the set of objects may be made available to a system operator or other user. This context information may comprise the age of the set of objects, measured in time periods, the current size of the set of objects, and/or stack trace or other information identifying the location in the program source code where the set of objects was recently enlarged. This above list is presented for illustrational purpose only, and it is not exhaustive. To reduce or limit the overhead desired to locate the root cause of the undesired object retention, the context information may be obtained after a set of objects is flagged in block 264, or, in other words, for the first time identified in block 266 as having unconstrained growth. Of course, this in no way limits the frequency with which the context information can be collected. Context information can be collected and stored at regular or irregular intervals subsequent to the identification of the object as having unconstrained growth. Per the embodiment depicted in FIG. 2B, a set of objects is indicated as having unconstrained growth when block 266 is reached.

In an implementation, the context information may be obtained by capturing a series of calls from one part of a program to another part of the program. A determination may then be made as to whether the calls result in adding objects to the previously identified set of objects. Those calls adding objects to that set may be a root cause of the undesired object retention.

Returning the discussion back to block 258, if this set of objects has been flagged, then a determination may be made as to whether sufficient time has elapsed since the most recently observed growth period to determine whether the set of objects discontinued the memory retention trend. More particularly, a number of periods since the most recent growth period may be determined by subtracting the period number of the peak period from the period number of the current period. The number of periods since the peak period is then compared (268) against a second threshold number N2.

The threshold number N2 may be a configurable parameter. In an embodiment, N2 may be different depending upon the set of objects being tracked. In another embodiment, N2 may be the same for each set of objects being tracked. Increasing the value of N2 for a set of objects makes the method 250 "remember for a longer time" the recent growth periods, so that the method 250 becomes more sensitive to (i.e. can less easily ignore) infrequent or smaller leaks. Decreasing the value of N2 for a set of objects makes the method 250 "remember for a shorter period of time" the recent growth periods, so that the method 250 tends to detect the more frequent or larger leaks, while tending to filter out the infrequent or smaller leaks.

If the number of periods since the peak period is greater than the second threshold number N2, then no memory leak is indicated (262) at this time in this set of objects. This is because a sufficient number of periods have elapsed since the most recently observed growth period. In other words, no growth period has been observed for a sufficiently long time.

On the other hand, if the number of periods since the peak period is less than or equal to the second threshold number N2, then a potential memory leak is indicated (266) in this set of objects. The indication may be sent to a system operator or other user.

Figure 3:
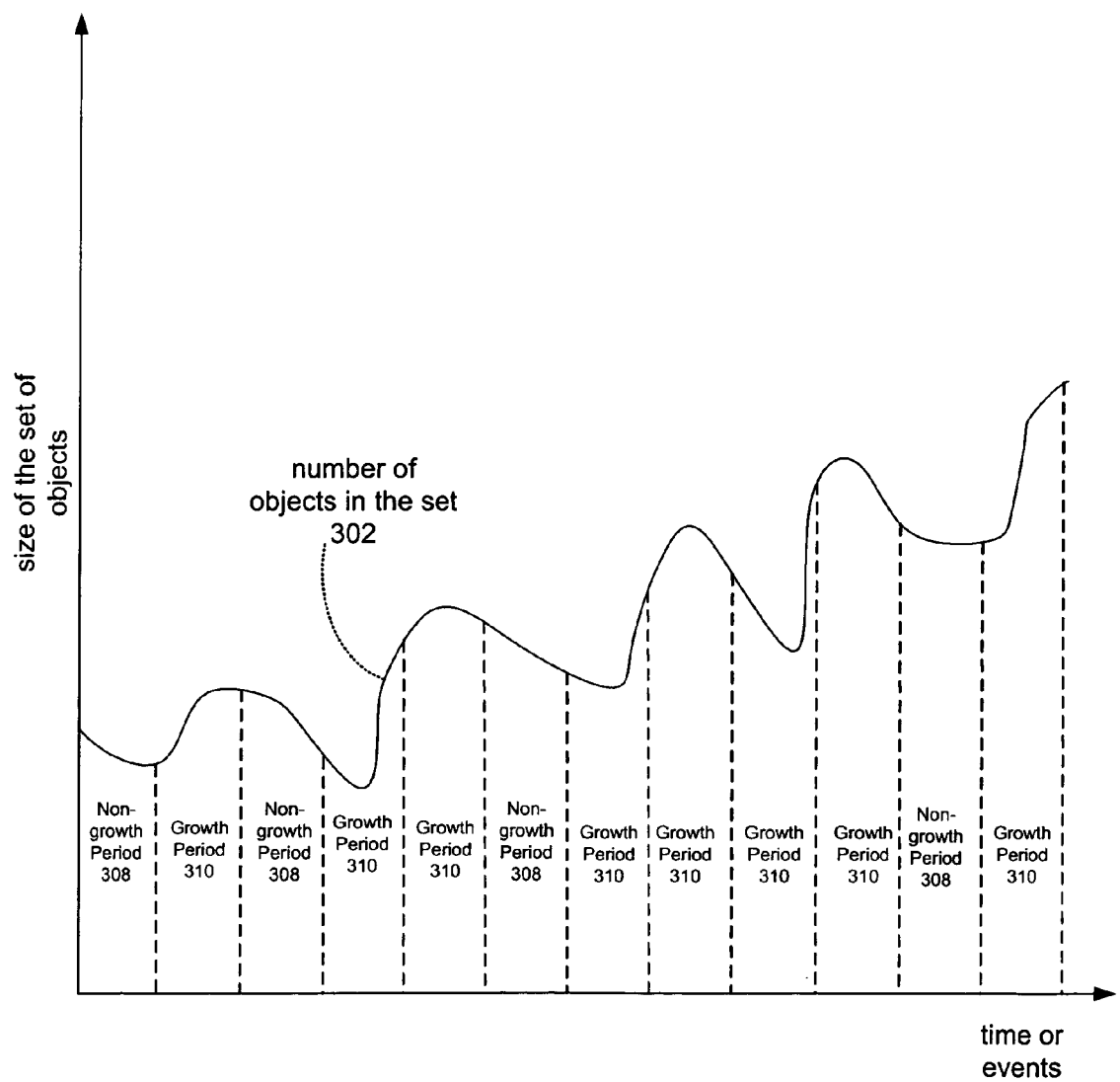
FIG. 3 is a graph depicting an example of the size for a set of objects over time or events in accordance with an embodiment of the invention.

FIG. 3 is a graph depicting an example of the size of a set of objects over time or events in accordance with an embodiment of the invention. The number of objects in the set 302 as a function of time/events is graphed (solid line). The time/event periods are shown by the vertical dashed lines. In this example, the length of each period is the same. Non-growth periods 308 and growth periods 310 are shown. A growth period 310 is a period where the size 302 of the set of objects reaches a new high. In other words, a growth period 310 is a period where the number of objects 302 is observed to exceed a previous maximum observed size.

Example Implementation

An example implementation of the methods 200 and 250 in FIGS. 2A and 2B is now described in accordance with an embodiment of the invention. In this example, the sets of objects to be tracked for memory leak purposes are determined by the objects belonging to standard Java collection classes. For each such object, the set of objects to be analyzed by method 200 is defined as the objects referenced (or "contained") by the collection object. Therefore, the set of objects to be analyzed may be considered identical with the objects belonging to the Java collection classes. For each collection class, a "wrapper" class may be used which is a subclass of the original class. When the application classes are loaded for execution, or dynamically as the application is executing, each creation of the collection object in the Java bytecodes is replaced with the creation of the corresponding wrapper (or suitably modified) collection object.

For example, if the original application creates an object of a "java.util.Hashtable" class, then the instrumented application (i.e. the application as modified in accordance with an embodiment of the invention) will create an object of a "wrappers.java.util.Hashtable" class, where "wrappers.java.util.Hashtable" is a subclass of "java.util.Hashtable." Similarly, if the original application declares a subclass of "java.util.Hashtable," the instrumented application will declare a subclass of "wrappers.java.util.Hashtable" instead.

The wrapper class includes additional fields (in addition to the inherited fields of the original class). For example, the additional fields may include:

numberOfGrowthPeriods;

maximumSize;

peakPeriod;

counter; and flaggedPotentialObjRetention.

The numberOfGrowthPeriods field may be used to count the number of growth periods observed. The maximumSize field may be used to track the maximum size ever observed. The peakPeriod field may be used for identification of the period in which the maximum size was observed.

The counter field may be used to count the times a new object was added to the set of objects. Such a counter may be used to determine when to perform a check for a memory leak in the set of objects. For example, a check for a memory leak in the set of objects may be performed when the counter modulo CONSTANT1==0, where CONSTANT1 is a constant number. A lower value for CONSTANT1 results in more frequent checking but higher overhead, while a higher value for CONSTANT1 results in less frequent checking and lower overhead. The value of CONSTANT1 may also be dynamically calculated by the system over time as the application runs or be reset by a mechanism that allows adjustment of the value from outside of the process, for any of a set of objects or for all objects.

The flaggedPotentialObjRetention field may be used to indicate that the set of objects has been identified as a potential memory leak in the past. See the use of the flag as discussed above in relation to FIG. 2B.

The following provides example pseudo-code indicating how the leak-locating instrumentation may be implemented in accordance with an embodiment of the invention.

```
package wrappers.java.util;
public class Hashtable extends java.util.Hashtable {
    private transient int numberOfGrowthPeriods;
    private transient int maximumSize;
    private transient int peakPeriod;
    private transient int counter;
    private transient boolean flaggedPotentialObjRetention;
    public Object put (Object key, Object value) {
        Object old = super.put(key,value);
        if (old == null) {
            // A new object has been added
            counter++;
            if (counter % CONSTANT1 == 0)
                check_for_memory_leak( );
        }
        return old;
    }
    private synchronized void check_for_memory_leak( ) {
        if (currentTimePeriod( ) != peakPeriod) {
            int size = super.size( );
            if (size > maximumSize) {
                maximumSize = size;
                peakPeriod = currentTimePeriod( );
                numberOfGrowthPeriods++;
                if (numberOfGrowthPeriods > N1 &&
                        !flaggedPotentialObjRetention) {
                    flaggedPotentialObjRetention = true;
                    CentralRepository.reportObject(this);
                }
            }
        }
    }
    public long getPeakPeriod( ) {
        return peakPeriod;
    }
}
package wrappers.java.util;
import java.util.ArrayList;
import java.io.*;
import java.lang.ref.WeakReference;
import wrappers.java.util.*;
public class CentralRepository {
    static class LeakEntry {
        int objId;                  // The id of the flagged collection object
        WeakReference wref;         // Reference to flagged collection object
        String strace;              // The stack trace of the leak location
        LeakEntry(int id, Object obj, String s) {
            objId = id;
            wref = new WeakReference(obj);
            strace = s;
        }
    }
    private static ArrayList leakList = new ArrayList( );
    private static int objId = 0;
    private static int leakId = 0;
    public static void reportObject(Object obj) {
        // Try to obtain the stack trace where the recent
        // object reference was added to the collection.
        String strace = null;
        try {
            throw new Exception( );
        }
        catch (Exception exc) {
            // Obtain the exception throw stack trace
            StringWriter strWriter = new StringWriter( );
            exc.printStackTrace( new PrintWriter(strWriter) );
            strace = strWriter.toString( );
            // The third frame should be the addition method
            // in the wrapper class. There could be more than
            // one frame that has this same method name/signature
            // (this method gets overridden in the subclasses).
            // So we need to parse the stacktrace to find
```

```
                // the first frame whose method is different from the
                // wrapper's add/put method. This is the leak location.
                strace = getLeakLocation(strace);
        }
        synchronized (leakList) {
                leakList.add( new LeakEntry(leakId++, obj, strace) );
        }
}
// Called periodically to check which objects in the leakList
// no longer satisfy the leaking condition and should be reported
// as not leaking (REPORT_NO_LEAK).
//
public static void checkLeaks( ) {
        // Remove null entries in the leakList
        synchronized ( leakList ) {
                Iterator ite = leakList.iterator( );
                while ( ite.hasNext( ) ) {
                        LeakEntry entry = (LeakEntry) ite.next( );
                        Object colObj = entry.wref.get( );
                        if ( colObj == null ) {
                                // Report that the previously reported leak is gone
                                REPORT_NO_LEAK(entry.objId);
                                ite.remove( );
                        }
                }
        }
        // Go through the leakList to report those objects that
        // satisfy the leak condition as potential leaks (REPORT_LEAK)
        // and report those objects that do not satisfy the leak
        // condition (REPORT_NO_LEAK).
        Object[] entries = leakList.toArray( );
        for ( int i = 0; i < entries.length; i++ ) {
                LeakEntry entry = (LeakEntry) entries[i];
                Hashtable colObj = (Hashtable) entry.wref.get( );
                if ( colObj != null ) {
                        long peakPeriod = colObj.getPeakPeriod( );
                        if (currentTimePeriod( ) - peakPeriod <= N2 ) {
                                // Report this collection object as a leak
                                int size = colObj.size( );
                                REPORT_LEAK(colObj, entry.objId, size,
                                        entry.strace);
                        }
                        else {
                                // Report that this object is no longer a leak
                                REPORT_NO_LEAK(entry.objId);
                        }
                }
        }
  }
}
```

The above example code utilizes "wrappers.java.util.Hashtable" as a subclass of "java.util.Hashtable" and uses the additional fields discussed above. In the example pseudo-code, upon flagging of a potential memory leak in java.util.Hashtable, a report of the potential memory leak is sent to a central repository. Once reported to the central repository, a periodic check for memory leaks may be performed using the formula (currentTimePeriod( ) minus object.peakPeriod is less than or equal to the second threshold number N2). (As discussed above in relation to block 268 in FIG. 2B.)

In the CentralRepository class, a java.util.ArrayList object leakList, is used to track the flagged collection objects (potential leaks). Each flagged object is represented by a LeakEntry, which includes the id used to identify the collection object, the leak location stack trace and a WeakReference to the collection object. A WeakReference is used so that the reference held will become null when the collection object gets garbage collected. When a collection object is flagged to be a potential leak, the reportObject method of the CentralRepository class is called to add this object to the leakList. In this method, the leak location stack trace is obtained by throwing and catching an exception. The addition method in the collection class is used to add references to the collection object. When the addition method is frequently called in the application, the collection size keeps growing, and will eventually cause the collection object to be flagged. This call site is treated as the leak source, the root cause of the undesired object retention.

Periodically, the method checkLeaks( ) is called to check whether: 1. the objects in the leakList satisfy the leaking condition and need to be reported; and 2. the objects that have been garbage collected need to removed from the leakList. The leaking condition was stated before, currentTimePeriod minus object.peakPeriod is less than or equal to the threshold N2. If the collection object satisfies this condition, it is reported as a leak with the leaking context (the leak location stack trace, the collection size, etc.). If the object does not satisfy the condition then it is reported as an object that is not a leak. If the object was garbage collected, it is removed from the leakList.

The above-disclosed solution has various advantages. It may be implemented with very low overhead, making it practical for continuous monitoring of deployed applications. In addition, it may be used to provide a user with the information to help understand where the leak is located and also how and why the memory leak is occurring. The alerting and analysis may be performed automatically by the instrumentation, with no user interaction.

In the above description, numerous specific details are given to provide a thorough understanding of embodiments of the invention. However, the above description of illustrated embodiments is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method for identifying sources of memory retention in an executing application, the method comprising:
    tracking a size for a set of objects over multiple time periods;
    determining a period to be a growth period if the size for the set of objects increases above a previous maximum size, otherwise determining a period to be a non-growth period;
    counting a number of growth periods within the multiple time periods;
    flagging the set of objects if the number of growth periods is greater than a first threshold number of growth periods;
    indicating a potential undesired object retention for the set of objects if the set of objects is flagged and the number of elapsed non-growth periods from the most recent growth period is less than or equal to a second threshold number, the second threshold number being a number of non-growth periods; and
    locating a source of the memory retention by finding a cause of a resource consumption growth.

2. The method of claim 1, further comprising limiting overhead to find the root cause by restricting a frequency at which said finding operation is performed for each identified set of objects.

3. The method of claim 2, further comprising determining a context of the root cause after the set of objects is flagged as having unconstrained growth.

4. The method of claim 1, further comprising determining a number of elapsed time periods from a most recent growth period.

5. The method of claim 1, wherein tracking the size of the set of objects is performed using sampling.

6. The method of claim 5, further comprising incrementing a counter when a new object is added to the set of objects by the application.

7. The method of claim 6, further comprising determining what the time to track the size of the set of objects is when the counter reaches a multiple of a constant number.

8. The method of claim 1, wherein the set of objects comprises objects aggregated by a collection class.

9. The method of claim 8, further comprising declaration of a wrapper class which is a subclass of the collection class.

10. The method of claim 9, wherein the wrapper class comprises additional fields including at least the number of growth periods, a maximum size observed, and a flag for indicating that the first threshold has been exceeded.

11. The method of claim 10, wherein the additional fields further include a peak period identifier for determining if a number of elapsed periods from a peak period is less than or equal to a second threshold number.

12. The method of claim 1, wherein the set of objects whose size is to be tracked comprises all objects of a particular type.

13. The method of claim 1, wherein the set of objects comprises all objects reachable from a given object in the application.

14. The method of claim 1, wherein the set of objects is specified by a user.

15. The method of claim 1, wherein a length of each period is a fixed time period.

16. The method of claim 1, wherein a length of each period is a variable time period in dependence on a configurable parameter.

17. The method of claim 16, wherein the configurable parameter comprises an application load.

18. An apparatus configured with a processor for identifying sources of memory retention, the apparatus comprising:
    processor-executable code configured to track a size for a set of objects over multiple periods;
    processor-executable code configured to determine a period to be a growth period if the size for the set of objects increases above a previous maximum size, and otherwise indicating a period to be a non-growth period;
    processor-executable code configured to count a number of growth periods over the multiple periods;
    processor-executable code configured to flag the set of objects if the number of growth periods is greater than a first threshold number of growth periods;
    processor-executable code configured to determine a number of elapsed non-growth periods from a most recent growth period; and
    processor-executable code configured to indicate a potential memory leak in the set of objects if the set of objects is flagged and the number of elapsed non-growth periods from the most recent growth period is less than or equal to a second threshold number, the second threshold number being a number of non-growth periods;
    processor-executable code to locate a source of the memory retention by finding a cause of a resource consumption growth.

19. A system configured with a processor for locating sources of memory retention, comprising:
    means for observing a size for a set of objects over multiple periods;
    means for designating a period as a growth period if the size of the set of objects increases above a previous maximum size, and otherwise designating a period as a non-growth period;
    means for tracking a number of growth periods within the multiple time periods;

means for setting a flag corresponding to the set of objects if the number of growth periods is greater than a first threshold number of growth periods;

means for calculating a number of elapsed non-growth periods from a most recent growth period; and means for reporting a potential memory leak in the set of objects if the set of objects is flagged and the number of elapsed non-growth periods from the most recent growth period is less than or equal to a second threshold number, the second threshold number being a number of non-growth periods; and means for locating a source of the memory retention by finding a cause of a resource consumption growth.

* * * * *